US00RE43318E

(19) United States
(12) Reissued Patent
Milekic

(10) Patent Number: US RE43,318 E
(45) Date of Reissued Patent: Apr. 17, 2012

(54) USER INTERFACE FOR REMOVING AN OBJECT FROM A DISPLAY

(75) Inventor: Slavoljub Milekic, Philadelphia, PA (US)

(73) Assignee: Flatworld Interactives, LLC, Villanova, PA (US)

(21) Appl. No.: 11/779,310

(22) Filed: Jul. 18, 2007

Related U.S. Patent Documents

Reissue of:
(64) Patent No.: 6,920,619
Issued: Jul. 19, 2005
Appl. No.: 09/096,950
Filed: Jun. 12, 1998

U.S. Applications:
(60) Provisional application No. 60/057,117, filed on Aug. 28, 1997.

(51) Int. Cl.
*G09G 5/08* (2006.01)

(52) U.S. Cl. ..... 715/859; 715/702

(58) Field of Classification Search ..... 715/769, 715/702, 859, 861, 863, 705, 711, 854, 847
See application file for complete search history.

(56) References Cited

U.S. PATENT DOCUMENTS

| | | | | |
|---|---|---|---|---|
| 4,678,869 | A | 7/1987 | Kable | |
| 4,972,496 | A | 11/1990 | Sklarew | |
| 5,019,809 | A | 5/1991 | Chen | |
| 5,031,119 | A | 7/1991 | Dulaney et al. | |
| 5,128,672 | A | 7/1992 | Kaehler | |
| 5,133,076 | A | 7/1992 | Hawkins et al. | |
| 5,146,556 | A * | 9/1992 | Hullot et al. | 715/790 |
| 5,157,737 | A | 10/1992 | Sklarew | |
| 5,202,828 | A | 4/1993 | Vertelney et al. | |
| 5,262,778 | A | 11/1993 | Saunders | |
| 5,297,216 | A | 3/1994 | Sklarew | |
| 5,325,984 | A | 7/1994 | Ady et al. | |
| 5,355,148 | A | 10/1994 | Anderson | |

(Continued)

FOREIGN PATENT DOCUMENTS

| | | |
|---|---|---|
| EP | 515664 | 12/1991 |

(Continued)

*Primary Examiner* — Steven Sax
(74) *Attorney, Agent, or Firm* — Gordon E. Nelson

(57) ABSTRACT

A digital system that may be used by children two years old and older. The digital system is contained in a child-proof case and has an upward-facing display with a touch-sensitive screen that is within easy reach of a child. Other I/O devices include proximity and motion sensors and a microphone, and there is also a loudspeaker. When a proximity sensor senses someone in the neighborhood of the system, it displays images on the display. A child may manipulate the images by touching them on the touch screen. Manipulations include selecting an image by touching it, "dragging" the selected image by moving the finger touching the image across the screen and "dropping" the image by lifting a finger from it, moving a selected image by touching another location on the screen and thereby causing the selected image to move to the touched location, removing an image from the screen by "throwing" it, i.e., moving it above a threshold speed, and modifying the image by tapping it twice and then moving the finger in a horizontal or vertical direction on the screen. The direction in which an image is thrown may further determine what the thrown image is replaced with. The manipulations are used to in activities such as shape matching, puzzle assembly, assembly of a face out of parts, and hide-and-go-seek.

20 Claims, 15 Drawing Sheets

U.S. PATENT DOCUMENTS 5,365,598 A 11/1994 Sklarew
5,367,130 A 11/1994 Isono
5,396,351 A 3/1995 Gessel
5,404,442 A * 4/1995 Foster et al. ..... 715/769
5,424,756 A * 6/1995 Ho et al. ..... 345/158
5,455,499 A 10/1995 Uskali et al.
5,463,725 A * 10/1995 Henckel et al. ..... 715/776
5,469,194 A 11/1995 Clark et al.
5,495,566 A * 2/1996 Kwatinetz ..... 715/785
5,508,719 A 4/1996 Gervais
5,545,857 A 8/1996 Lee et al.
5,558,098 A 9/1996 Fain
5,564,007 A * 10/1996 Kazen-Goudarzi et al. .. 715/763
5,585,823 A 12/1996 Duchon et al.
5,600,765 A * 2/1997 Ando et al. ..... 345/668
5,611,031 A * 3/1997 Hertzfeld et al. ..... 715/740
5,615,384 A * 3/1997 Allard et al. ..... 715/800
5,616,078 A * 4/1997 Oh ..... 463/8
5,659,378 A 8/1997 Gessel
5,661,635 A 8/1997 Huffman et al.
5,663,748 A 9/1997 Huffman et al.
5,668,570 A * 9/1997 Ditzik ..... 345/173
5,670,755 A 9/1997 Kwon
5,697,793 A 12/1997 Huffman et al.
5,727,141 A 3/1998 Hoddie et al.
5,729,219 A 3/1998 Armstrong et al.
5,732,230 A * 3/1998 Cullen et al. ..... 395/339
5,745,116 A 4/1998 Pisutha-Arnond
5,745,715 A 4/1998 Pickover et al.
5,745,716 A 4/1998 Tchao et al.
5,764,218 A 6/1998 Della Bona et al.
5,844,547 A * 12/1998 Minakuchi et al. ..... 345/173
5,845,263 A * 12/1998 Camaisa et al. ..... 705/27
5,898,434 A 4/1999 Small et al.
5,929,840 A * 7/1999 Brewer et al. ..... 715/862
5,973,670 A * 10/1999 Barber et al. ..... 345/157
5,986,224 A * 11/1999 Kent ..... 178/18.04
6,005,545 A * 12/1999 Nishida et al. ..... 345/603
6,043,810 A 3/2000 Kim et al.
6,088,032 A * 7/2000 Mackinlay ..... 345/848
6,115,482 A * 9/2000 Sears et al. ..... 382/114
6,137,484 A 10/2000 Hoddie et al.
6,281,879 B1 * 8/2001 Graham ..... 345/157
6,542,164 B2 * 4/2003 Graham ..... 715/711
6,816,148 B2 * 11/2004 Mallett et al. ..... 345/157

FOREIGN PATENT DOCUMENTS

GB 2262644 6/1993
GB 2302429 1/1997
GB 2305715 4/1997
GB 2317022 3/1998
WO WO9531765 5/1994
WO PCT/US94/05440 1/1995
WO WO9531766 11/1995
WO PCT/US97/13611 2/1996
WO WO9606401 2/1996
WO WO9624095 8/1996
WO WO9635162 11/1996
WO WO9642068 12/1996
WO PCT/US96/18855 6/1997
WO PCT/US96/18856 6/1997
WO PCT/US96/19119 6/1997
WO PCT/US96/19347 6/1997
WO PCT/US96/19570 6/1997
WO PCT/US96/19609 6/1997
WO PCT/US96/19637 6/1997
WO PCT/US96/19638 6/1997
WO PCT/US96/19701 6/1997
WO PCT/US96/19704 6/1997
WO PCT/US96/19711 6/1997
WO PCT/US96/19783 6/1997
WO PCT/US96/19784 6/1997
WO PCT/US96/19786 6/1997
WO PCT/US96/20011 6/1997
WO PCT/US96/20012 6/1997
WO PCT/US96/20013 6/1997
WO PCT/US96/20186 6/1997
WO PCT/US96/20451 6/1997
WO PCT/US96/20505 6/1997
WO PCT/US96/20909 6/1997
WO PCT/US96/20910 6/1997
WO PCT/US96/19951 7/1997
WO PCT/US97/12891 7/1998
WO PCT/US96/20908 6/1999

* cited by examiner

301

801

```
                                  1203      1205
CARD GRAPHIC: Leye5 ID No: 100
                                                  1201
on MouseDown ——— 1207
moveMe ——— 1213
end MOuseDown

on MoveMe
global StartTime
global OrigPosition      1217
global CurrPosition
global CurrPict
1215A
put the ticks into StartTime ——— 1219 -- reset timer every time
    the screen is touched

set the loc of the target to MouseLoc() ——— 1221
put the short name of the target into CurrPict ——— 1223
put the loc of the target into OrigPosition ——— 1225
```

Fig. 12

```
repeat forever
put mouseLoc() into OldPosition
set the loc of the target to MouseLoc()   1303
wait 2 ticks                                          1301
put mouseLoc() into CurrPosition   1305
if the mouse is up then exit repeat   1309
end repeat
put the ticks into StartTime          -- reset timer   1312
if (item 1 of OldPosition - item 1 of CurrPosition) > 2 then
throwLeft   1313
GetNewPart   1315                                     1311
exit MoveMe
end if

if (item 1 of CurrPosition - item 1 of OldPosition) > 2 then
throwRight
GetNewPart
put the ticks into StartTime          -- reset timer
exit MoveMe
end if

if (item 2 of CurrPosition - item 2 of OldPosition) > 2 then
throwUp
GetNewPart                                            1317
put the ticks into StartTime          -- reset timer
exit MoveMe
end if

if (item 2 of OldPosition - item 2 of CurrPosition) > 2 then
throwDown
GetNewPart
put the ticks into StartTime          -- reset timer
exit MoveMe
end if

-- DO RESIZE?
wait 20 ticks                                         1319
if the mouse is down then
resizeMe
put the ticks into StartTime          -- reset timer
flushEvents MouseDown                 -- GET RID OF ACCUMULATED
EVENTS
exit MoveMe
end if
end MoveMe
```

1215B

Fig. 13

```
on resizeMe
global CurrPict
global OrigPosition

set the showPen of cd grc CurrPict to "true"
repeat while the mouse is down

put MouseLoc() into Position1
wait 8 ticks
put MouseLoc() into Position2
if the mouse is up then exit repeat

-- HEIGHT AND WIDTH (UP and DOWN)
if item 2 of Position1 > item 2 of Position2 and (height of cd
grc CurrPict) < 400 then
set the height of cd grc CurrPict to the height of cd grc
CurrPict + 10
end if
if item 2 of Position1 < item 2 of Position2 and (height of cd
grc CurrPict-20) > 40 then
set the height of cd grc CurrPict to the height of cd grc
CurrPict - 10
--set the width of the target to width of cd grc CurrPict - 10
end if

-- WIDTH  (LEFT and RIGHT)
if item 1 of Position1 > item 1 of Position2 and (width of cd grc
CurrPict) < 400 then
set the width of cd grc CurrPict to width of cd grc CurrPict + 10
end if
if item 1 of Position1 < item 1 of Position2 and (width of cd grc
CurrPict-20) > 40 then
set the width of cd grc CurrPict to width of cd grc CurrPict - 10
end if
end repeat
set the showPen of cd grc CurrPict to "false"
set the loc of the cursor to OrigPosition      -- PREVENT IT FROM
MOVING TO NEW Loc.
-- FOR FAST PROCESSORS
end resizeMe
```

1401 1402 1403 1404 1405 1407 1409 1411

Fig. 14

```
1501  on throwLeft
      global CurrPosition
      put item 2 of CurrPosition into ypos — 1503
      move the target to -100,ypos — 1505
      end throwLeft

      on GetNewPart
      global MediaPath
      global OrigPosition
      global CurrPict

      set the name of the target to "thrashedOne" — 1508
      put empty into NewPict

      put char 2 to (len(CurrPict)-1) of CurrPict into ObjectName

      repeat with n=1 to number of graphics
      put the short name of cd grc n into GrcName

      if GrcName contains ObjectName then
      if last char of GrcName = last char of CurrPict then
      exit repeat
      else
      if char 1 of GrcName is "L" then
      put "R"&(char 2 to len(GrcName) of GrcName) into NewPict
      exit repeat
      end if
      if char 1 of GrcName is "R" then
      put "L"&(char 2 to len(GrcName) of GrcName) into NewPict
      end if
      end if
      end if
      end repeat

      if NewPict is empty then
      repeat forever
      put random(6) into NewNo                    -- # OF SETS of
           FACE PARTS
      if NewNo <> last char of CurrPict then
      exit repeat
      end if
      end repeat
      put (char 1 to (len(CurrPict)-1) of CurrPict)&NewNo into NewPict — 1516
      end if

      set the PictureData of cd grc "thrashedOne" to
      MediaPath&"faces:"&NewPict
      move cd grc "thrashedOne" to OrigPosition
      set the name of cd grc "thrashedOne" to NewPict
      end GetNewPart
```

1511 1513 1509 1515 1517

Fig. 15

USER INTERFACE FOR REMOVING AN OBJECT FROM A DISPLAY

Matter enclosed in heavy brackets [ ] appears in the original patent but forms no part of this reissue specification; matter printed in italics indicates the additions made by reissue.

REFERENCE TO RELATED PATENT APPLICATIONS

The present patent application claims priority from U.S. Provisional Application 60/057,117, Slavoljub Milekic, Child-friendly Digital Environment, filed Aug. 28, 1997.

BACKGROUND OF THE INVENTION

1. Field of the Invention

The invention relates generally to digital systems and more particularly to digital systems that are adapted to use by children two years old and older. One aspect of such a digital system is a graphical user interface that requires neither typing skills nor fine visual-motor coordination.

2. Description of the Prior Art

Ever since interactive computer systems became available in the 1960's, they have been used to educate and entertain children. Entire industries dedicated to interactive games and educational software have arisen and the Internet has literally made the whole world available to a child with access to a personal computer that is connected to the Internet. Educational uses of the computer have ranged from employing it as a page turner and exercise checking machine through using the fact that it can be programmed to teach analytical thinking and problem solving skills. For an example of the last kind of application, see Seymour Papert, Mindstorms, Basic Books, 1980.

Until now, the computer as used for the education or entertainment of children has had the same basic form as the computer as used in the workplace: the display sits on a desk and has a vertically-mounted screen and input to the computer has been by way of a keyboard and a pointing device such as a mouse that sit on the desk with the display. The graphical user interfaces have generally been based on at least two out of three assumptions: the user can type, the user can read, and the user has the fine motor coordination necessary to manipulate the buttons, sliders, and icons typical of modern graphical user interfaces.

The orientation of the screen, the input devices, and the graphical user interfaces together render a standard computer unusable by children of pre-school age. Such children are too short to see the display or reach the keyboard and mouse, they cannot read, they cannot type, and even if they could reach the keyboard and mouse, they do not have the fine motor coordination necessary to use the graphical user interface. Moreover, a standard computer is not child-safe: it has an exposed power cord and other cords connecting components such as the keyboard and mouse to the CPU.

What is needed if small children are to be able to take care of the educational and entertainment opportunities offered by the computer is a digital device which has been rendered child-safe and which has a user interface that permits direct manipulation of objects in the display and requires neither literacy nor typing skills nor fine motor coordination. It is an object of the present invention to provide such a digital device.

SUMMARY OF THE INVENTION

The child-friendly digital system of the invention differs both in its physical aspect and in its graphical user interface from standard digital systems. In its physical aspect, the child-friendly computer system is contained in a toddler-proof case that rests on the and has a touch-sensitive screen that is within easy reach of a toddler. Images are displayed on the touch-sensitive screen and the child-friendly digital system responds to touches on the display by altering the display. Other features of the physical aspect include an upward-facing display, sensors for sensing the presence of the child and motion above the display, a microphone for receiving voice inputs, and a loudspeaker. The child-friendly digital system has not cords or other appendages. In one embodiment, the digital system is portable; in another, it is a fixed unit.

The graphical user interface for the child-friendly digital system is based on manipulating an image on the touch-sensitive screen by touching the image directly. If an image is movable, touching the screen at the image selects the image for moving; moving the touched point within a selected image causes the image to move with the touched point, thus permitting the image to be dragged. An image that has been selected for moving may also be caused to move to another location by touching a point elsewhere on the screen. The touch causes the selected image to move to the selected point. If the screen is touched at two or more points simultaneously, the image moves to a point between the touched points. If the image is dragged at a speed above a threshold velocity, the image is "thrown away from" the display and may be automatically replaced by another image. Depending on the direction in which the image is dragged, the image may be replaced by one of the same kind or one of a different kind. If an image is tapped twice in short succession, with the finger remaining down after the second tap, the image is selected for modification. Moving the finger on the screen when an object has been selected for modification causes the object to change size in directions that depend on the direction of motion of the finger on the screen. The actions permitted by the graphical user interface are used to implement activities including shape sorting, puzzle assembly, hide-and-go-seek, and what might be called a digital picture book.

Other objects and advantages of the invention will be apparent to those skilled in the arts to which the invention pertains upon perusing the following Detailed Description and Drawing, wherein:

BRIEF DESCRIPTION OF THE DRAWING

FIG. 12 shows a first portion of a script for the face assembly activity;

FIG. 13 shows a second portion of the script;

FIG. 14 shows a third portion of the script; and

FIG. 15 shows a fourth portion of the script.

Figure 1:
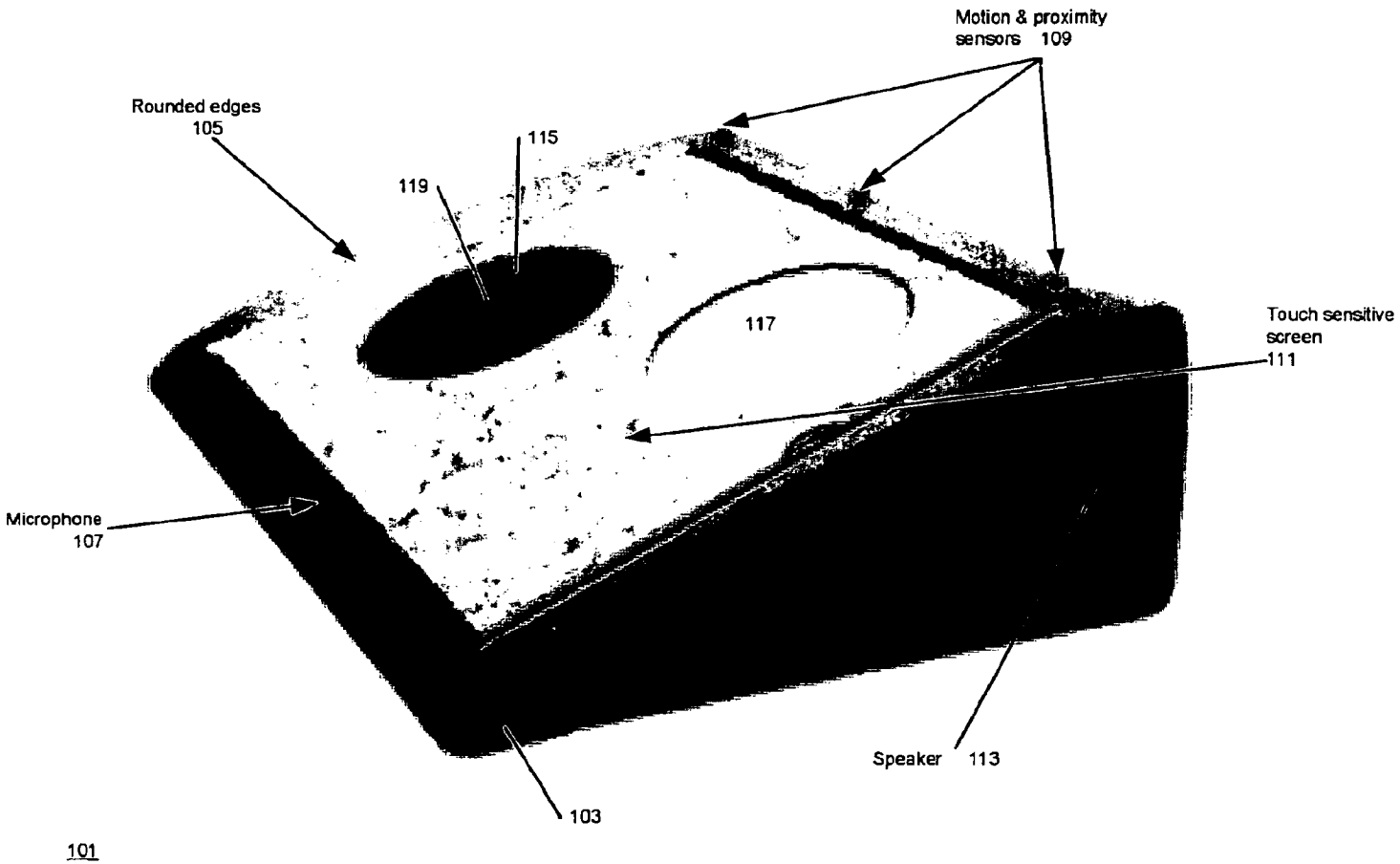
FIG. 1 shows a portable embodiment of the child-friendly digital system.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The Detailed Description begins with an analysis of the kinds of changes that must be made in a digital system if it is to be usable by pre-school children, continues with a description of the physical construction of such a system, and then describes the graphical user interface for such a system. Finally, the Detailed Description provides a detailed disclosure of the implementation of important aspects of the graphical user interface.

What Needs to be Changed to Make a Digital System Child Friendly

There are three major areas which need to be addressed in making digital systems child-friendly. They can be loosely defined as changes in a) location, b) mode of interaction and c) content structure. Each of these changes will be briefly described in the following paragraphs.

Change in location. Although it seems trivial at first, change of location of objects is the first indicator of the psychological change of domain perception. Just moving the computer from the desk to the floor makes it more accessible to children but also indicates to them that the computer is a legitimate part of their environment. Of course, modern computers would hardly survive this change, because they were not built with children in mind. Moving computers to the floor would also mean making them: at least as child-resistant as any good toy. As simple as it is, change in location also implies a host of other changes in the design of child-friendly digital devices. First, a child-friendly digital system should lose all of its appendages and the cords that connect them. This means getting rid of the power cord, the keyboard, the mouse, and their cables, and making the image-displaying part self-standing (battery operated or with a concealed electric cord). Putting the display on the floor also means change in the orientation of the viewing surface from perpendicular (where the child had to look up) to a more physiological upward-facing angle.

Change in mode of interaction. The change in the mode of interaction is not only dictated by the change in location, but is also necessitated by the inadequacy of the keyboard and the mouse as input devices for children. Both devices depend on possession of special kinds of knowledge and skills, not readily available to children. The keyboard requires not only competent writing (and typing) skills but also knowledge of specific vocabulary and its use (for example, that typing "exit" will end the current game). This does not mean that in a child-friendly interface environment keys would be banned from existence, but only that their number, size and function would dramatically change.

The mouse suffers from similar shortcomings. Not only is it inherently abstract (moving the mouse moves something in the display, but not always . . . ) but it also involves fine visual-motor coordination. The 'folders' displayed in a typical modern graphical user interface are approximately ¼ inch square and it is within this range that the child has to coordinate the movement with the 'click' (sometimes even 'double-click') in order to make something happen. The size of the interface elements is not the only problem. One could easily increase the size of typical 'buttons' on the screen and use another input device (like the touch-sensitive screen), but the problem of interaction still remains. The adult-designed ubiquitous 'desktop' metaphor with its files and folders, and subfolders and 'windows' (on the desktop?!) is hardly a typical child's handy metaphor. The necessity for changing not only the input devices but also the way the digital information is rendered accessible is the topic of the next section.

Change in content structure. The change in content structure does not mean change in content per se, but rather change in the way the content is organized and presented to the child. To an illiterate person (or a child) all the 'folders' on a computer display look pretty much the same. Thus, in a child-friendly digital environment the indicators of content should be clearly distinct visually and represent familiar aspects of the child's experience. However, this is the most superficial change necessary. There are other aspects of children's activity that call for more radical changes. These are a) making the information (content) manipulable, and b) making the content structure compatible with the child's social environment.

a. The idea that making the information experientially accessible to the child leads to more efficient knowledge transfer has been around for some time but has not been consistently implemented in the area of child/computer interface design. Thus objects should be made manipulable in the way which makes sense to the child and provides feedback which can compensate for the unavoidable impoverishment of sensory input in comparison to equivalent real-world manipulations. Several ways of achieving this goal will be discussed in the following.

b. Making the content structure compatible with the child's social environment means that it readily supports the social interactions a child is likely to engage in: interactions (playing) with peers and interactions with adults (educators, parents). Originally, computers (as the 'personal' part of 'PC' implies) inhibited interaction and collaboration between individuals. It is only recently, with the popularization of the Internet (which was made possible by a friendlier interface design) that the importance of supporting collaboration is being discovered again, and that different software products supporting it are boasting three-digit return rates. Although it is possible to imagine similar solutions for children's computer environments, it is important to realize that a child-friendly environment has to support social interactions more concretely, and respond appropriately to simultaneous and possibly divergent inputs on the same physical unit.

Figure 2:
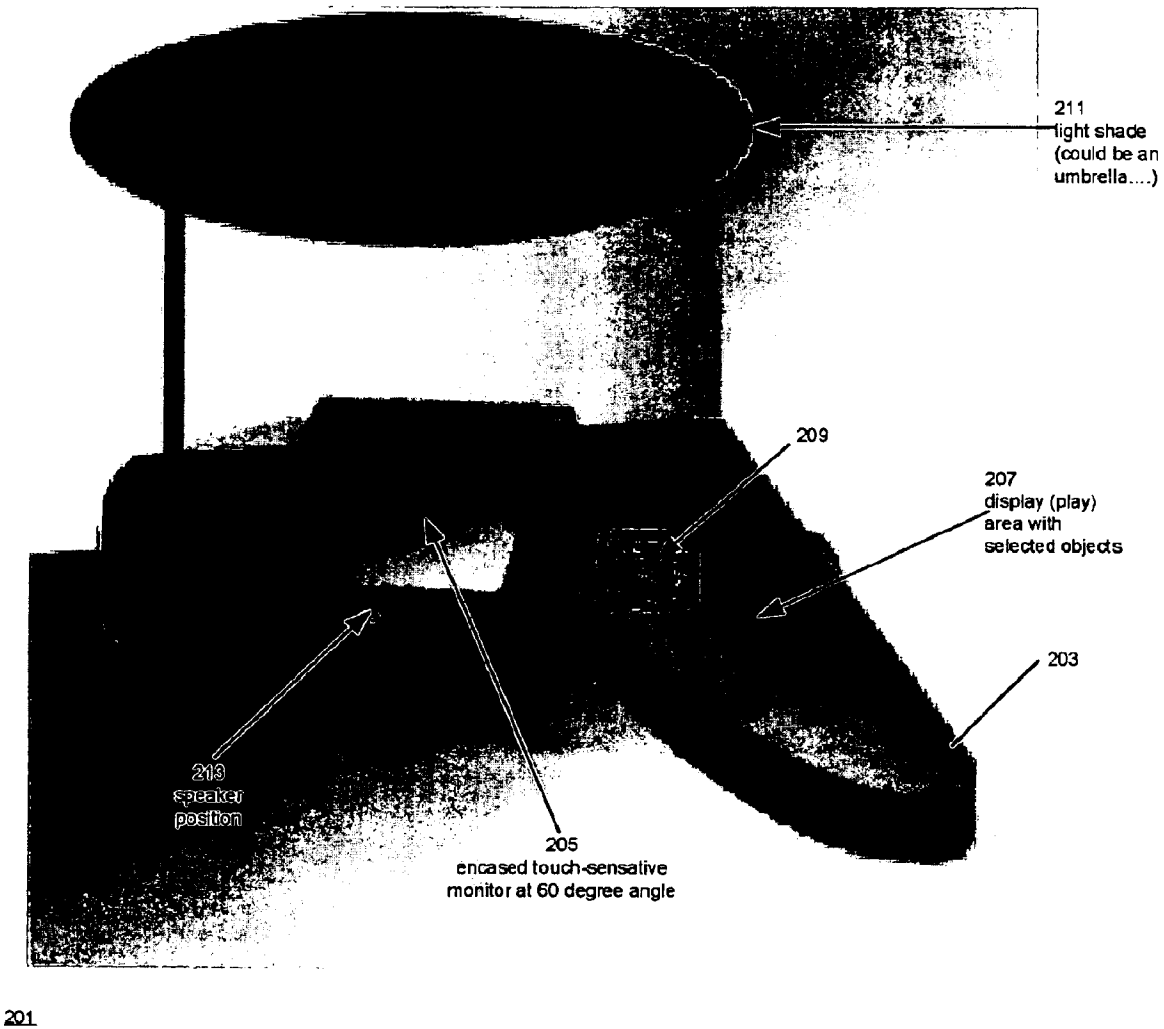
FIG. 2 shows a non-portable embodiment of the child-friendly digital system.

Hardware for a Child-Friendly Digital System: FIGS. 1 and 2

As described above, moving the digital system from the desktop to the floor leads to dramatic changes in design. The system loses separate input devices such as the keyboard and mouse and is reduced to the display unit. Ideally, the display itself should be compact, mobile, and with an upward-facing touch-sensitive viewing surface It should also be rugged, scratch-resistant and use a built-in power source. The unit should also have ample storage capacity and a way to quickly access, modify and update stored information. Digital systems with some of the above characteristics are already available. They may be found in ATM machines and in kiosks for finding locations in superstars, malls, airports, or even museums. None of them, however, is designed to sit on the floor or has a graphical user interface that a preschooler can use.

FIGS. 1 and 2 show two versions of the hardware for a child-friendly computer system. FIG. 1 shows a portable child-friendly digital system 101 and FIG. 2 shows a stationary version. As shown in FIG. 1, portable digital system 101 is based on a laptop computer (not shown). Digital system 101 has a touch-sensitive active matrix LCD display 111, and the suggested minimum configuration for the laptop is a, 1.6 G hard drive, 32 MB RAM, a 28.8 modem, a 16-bit sound card, and a built-in infra-red communications port. The laptop components are fitted into case 103 of heavy duty molded plastic with rounded edges 105. Display 111 forms the top of case 103. Also housed in the case are microphone 107, speakers 113, and motion/proximity sensors 109, all of which are connected to the laptop computer. Display 111 serves both as an input device and an output device, microphone 106 and sensors 109 serve as additional input devices, and speakers 113 serve as output devices for the laptop. Sensors 109 permit the system to sense the presence of the child and to respond with verbal prompt, movement, or sound. Sensors 109 are built into the top edge of the child-friendly digital system and consist of a series of sensitive motion and proximity sensors with varying fields of view. The 'points' of view of different sensors divide the space in front of the unit into a virtual grid, which makes it possible not only to detect the presence of the child, but also to incorporate simple gestures (for example, moving of the hand from left to right) into interaction with the software. As shown in FIG. 1, display 111 is set up for a shape-matching game: it displays two objects, a circle 115 and a cutout 117 into which circle 115 fits.

The stationary version 201 of the digital system is better suited for museums and day-care centers. It has the same technical characteristics as portable system 101 but is based on a desktop computer with a touch-sensitive monitor 205. The system is configured as shown in FIG. 2. The CPU is hidden inside a structure 203 encasing monitor 205. The whole structure 203 is built in such a way that it can support an average adult's weight and should have a non-slippery surface and no sharp corners or edges. Structure 203 further contains a speaker 213 and may also contain a microphone and motion and proximity sensors. It may also have a light shade 211 to make the display on monitor 205 more easily visible to users of system 201. Structure 203 finally provides a play area upon which selected objects 209 can be displayed. If the objects are the same as those being displayed in display 205, system 201 will help children begin to understand how a three-dimensional object is related to its two-dimensional representation.

Child-Friendly Graphical User Interface

The graphical user interface in system 101 or 201 is based on the touch-sensitive display, the motion and proximity sensors, and a voice recognition system that is made using microphone 107 and custom-made or commercially available voice recognition software such as Dragon Naturally Speaking from Dragon Systems, Inc. or Via Voice from IBM Corporation. The touch screen is employed as the primary user input device for a number of reasons. Pointing to and touching an item are the most natural ways of indicating its selection, and require no training even in very young children. Touch screens are very durable, have no moving parts, and require almost no maintenance. Since they are superimposed over the viewing surface, they demand no additional space. A host of studies on adults (summarized in Sears and Schneiderman, "High precision Touch screens: design strategies and comparisons with a mouse", International Journal of Man-Machine Studies 34, pp. 598-613, 1991) indicate that Touch screens are the fastest pointing devices. However, if used for the selection of very small targets (less than 10 mm in diameter), they are also the ones with the highest percentage of error rates. The results were partially caused by the low resolution of older Touch screens and the returning of multiple pixel locations by the touch screen hardware. In the past several years both the increased resolution of touch screens and the software-implemented strategies for stabilizing the touch location have reduced touch screen error rates and brought them in line with those of the mouse. It is worth noting that even with the older touch screens there was no difference in error rates between the touch screen and the mouse in conditions where larger selection targets were used. A pilot study conducted at the Hampshire College Cognitive Development Lab has shown that even children as young as 2 years find the use of a touch-sensitive screen intuitive and easy. Furthermore, their performance on a simple visual mapping task was quite good, possibly as the result of the decrease in cognitive load associated with the interface.

While the touch screen makes a child-friendly graphical user interface possible, it is not sufficient by itself. Since preschoolers cannot read and do not have the fine motor coordination necessary for standard GUIs, the GUI had to be redesigned to employ interactions that were easy for the preschoolers. The interactions included the following:

Selection: Selection of an object such as circle 115 in display 111 is carried out by touching it. There is no traditional highlighting of the selected object (necessary for the mouse input) because of the existing haptic feedback. However, since all of the objects have defined 'anchor' points (119 in object 115) which are used for 'dragging' action, there is often a small movement of the selected object as it aligns its anchor point with the touch point. Selection may be further indicated by a visual "lifting" of the selected object (i.e., a discrete shadow is added to the object when it is selected and/or by a discrete auditory signal when the object is selected or released.

Moving objects: Selected objects can be dragged by moving the finger across the screen, and 'dropped' by lifting the finger. If objects are dropped over the appropriate slot (117 in FIG. 1) (which usually corresponds in size and shape to the object being dropped), there is a suitable form of visual and acoustic feedback.

In addition to the traditional mouse-supported actions, there are three more types of interaction supported in the graphical user interface: pointing to a location, throwing the object, and pushing the object.

Pointing to an object: Pointing to a location consists of simply touching screen 111 at the desired location. If what was last selected was an object, the touch may cause the object to move to the location that was touched. If what was last touched was a slot, the object that fits the slot will move to the location that was touched.

Throwing an object: The throwing action is executed when the speed at which an object is dragged across display 111 exceeds a threshold speed which corresponds more or less to the speed of the natural throwing motion. When the threshold is exceeded, the 'thrown' object will continue to move in the same direction even when the finger is lifted off the screen. One use of throwing is to remove an object from the display.

Pushing: When the child's finger is moved along display 111 and touches the side on an object, the object starts moving in the same direction in front of the finger. The motion is terminated when the finger is lifted up from the screen or when it stops moving.

Object modification: Some objects may be modified by the child. When the child taps the object twice and doesn't raise its finger after the second tap, the object is surrounded by a red outline. If the child then moves its finger up or down on the screen, the object changes size in the vertical direction; if the child moves its finger sideways on the screen, the object changes size in the horizontal direction.

Voice recognition: The voice recognition mode of interaction allows the child to perform simple actions and navigation using oral commands like "go", "no", "more", "new", etc.

Hand gestures: Simple hand gestures (without touching of the screen) can be used for interaction in certain contexts. For example, moving a hand in horizontal direction in front of the screen may cause depicted objects, images, or pages to be 'flipped' in the appropriate direction. Another example is that of 'zooming' into the picture by just moving the palm of the hand closer to the screen (that is, to the proximity sensor).

Using the Interactions to Make Activities

The following portion of the description shows how the interactions described above may be used to make activities for preschoolers.

Figure 3:
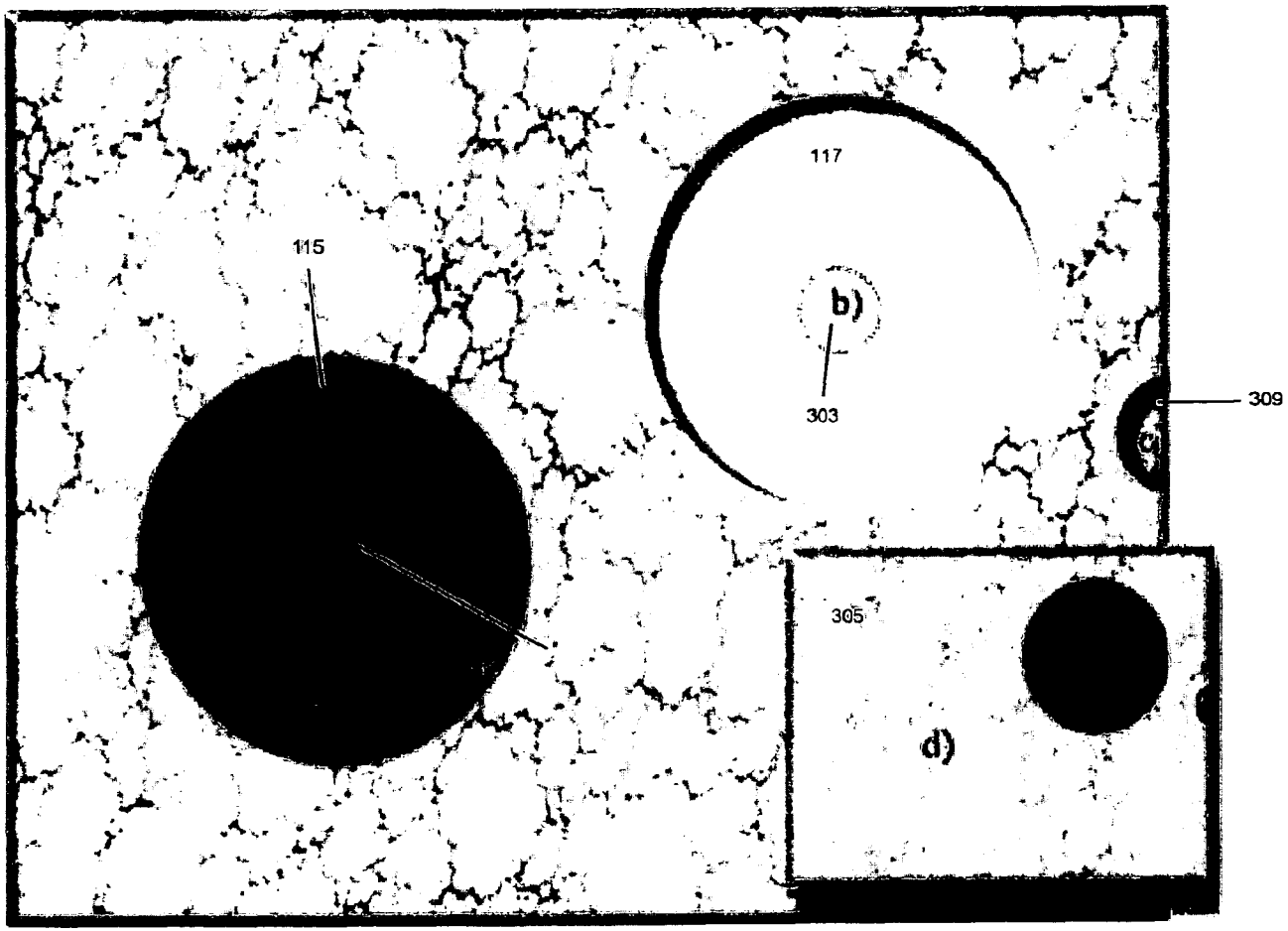
FIG. 3 shows a display from a first shape-matching activity performed on the child-friendly digital system.
Figure 4:
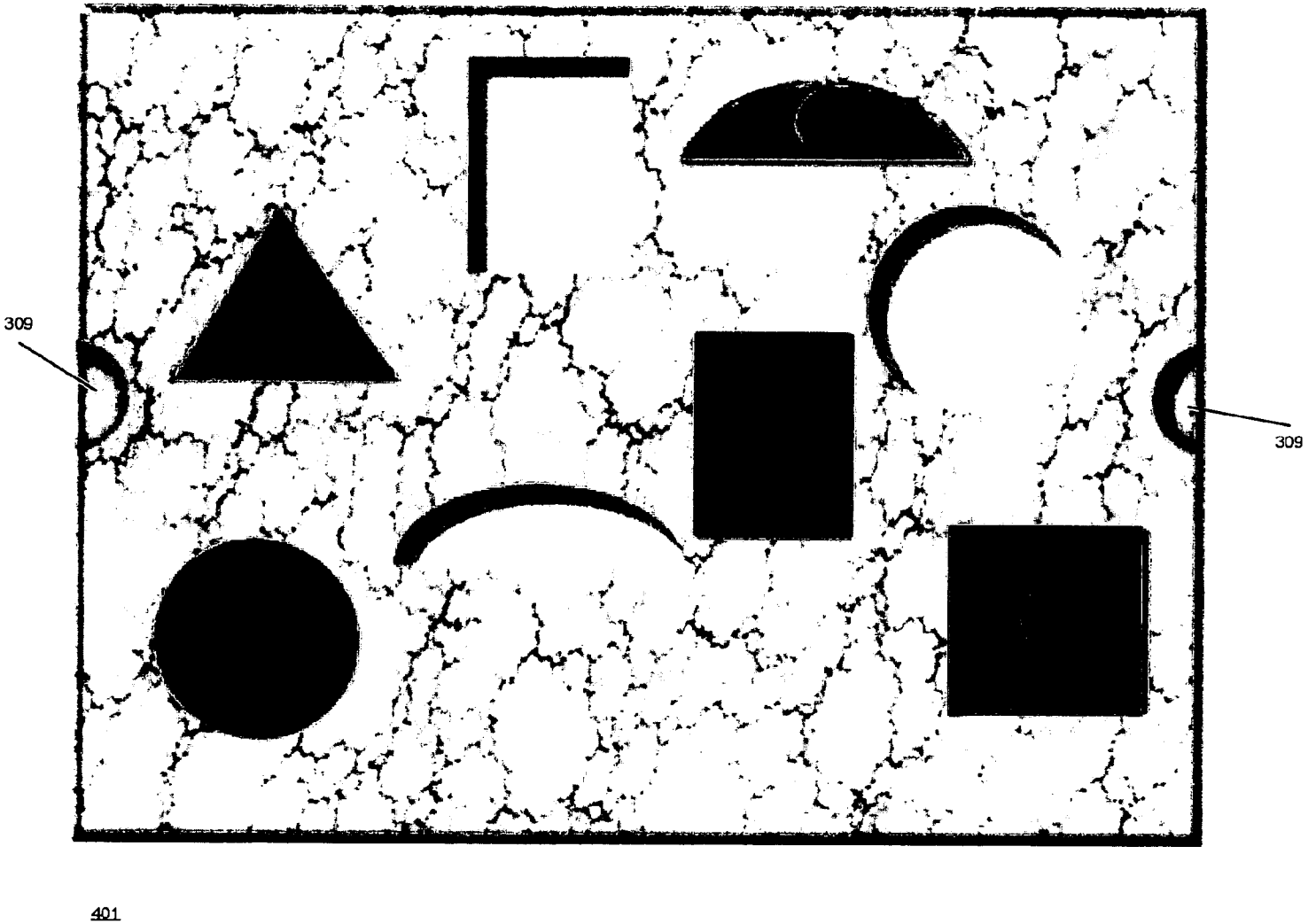
FIG. 4 shows a display from a second such shape-matching activity.
Figure 5:
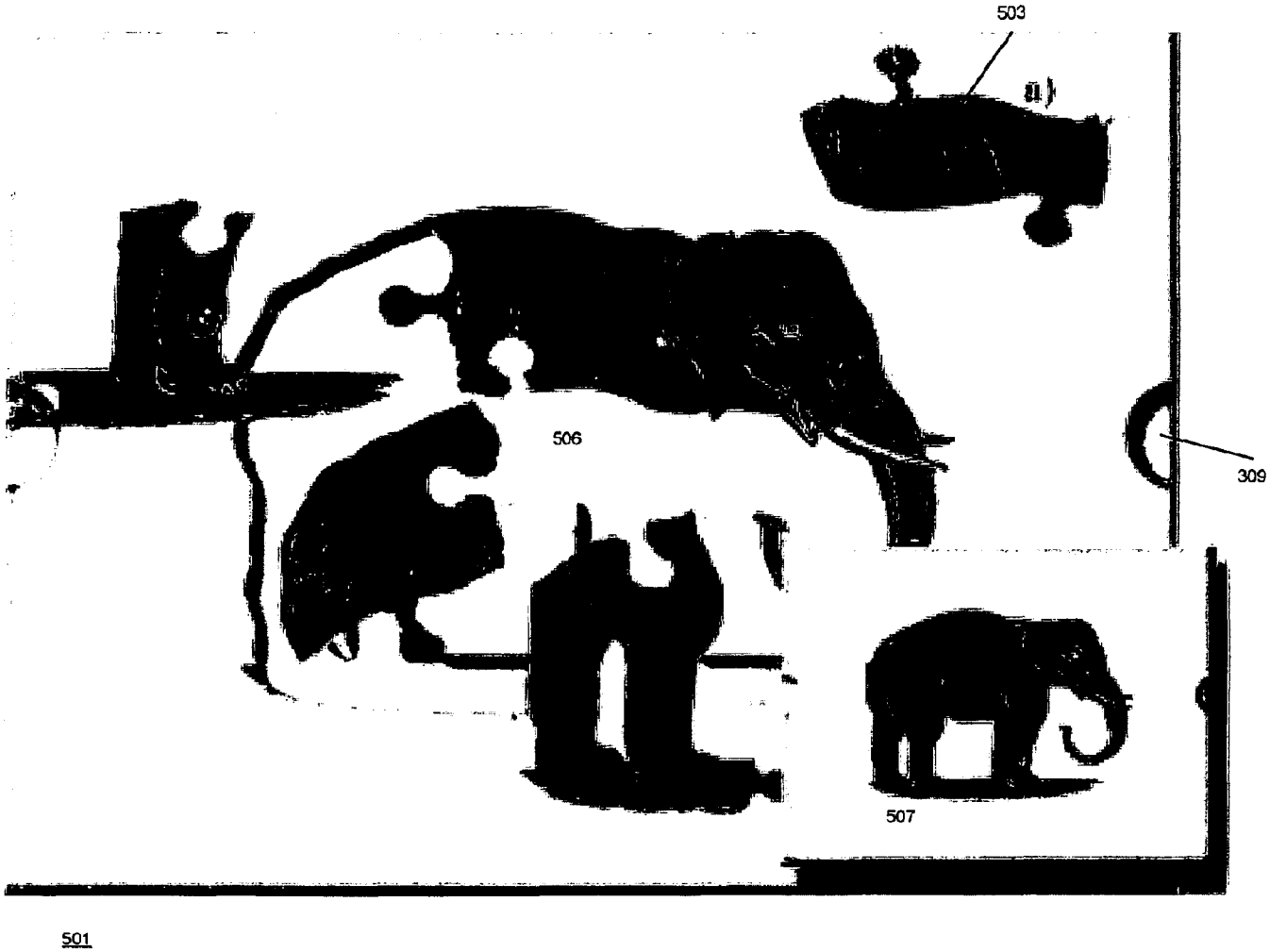
FIG. 5 shows a display from a puzzle assembly activity.

Matching: FIGS. 3-5

FIG. 3 shows how objects like circle 115 may be selected by touching and once selected, they may be dragged to another location by moving the finger across the screen. When selected (touched) the object aligns its geometric center 119 with the tip of the finger, thus indicating the selection. When dragged to within close proximity to the matching cutout, the object is 'pulled' into the cutout, as shown in inset 305. The size of the area which triggers the 'pulling' of the object (indicated by dotted line 303 above, not visible on the actual screen) is adjustable, making it possible to compensate for the lack of fine coordination (for example, in very young children) during matching. If the child taps on cutout 117, matching object 115 will move on its own to cutout 117. Side cutouts like 309 indicate possible navigational paths. Touching side cutout 309 leads to another screen, often with a new type of activity.

As shown in FIG. 4, the simple matching of FIG. 3 can be expanded to make a matching game that works like a shape sorting box. In display 401, objects can be selected and moved anywhere on the screen. If placed over or in close proximity to the matching cutout the object will be 'pulled in'. In display 401, the triangle and the square shapes are already in their matching, cutouts. Navigation is carried out via the side cutouts. Touching the left cutout 309 leads to the previous screen, while touching the right cutout leads to a new screen. Display 401 can thus provide a child with an entire collection of shape sorting boxes. When a child drag an object, the loudspeaker emits by a 'scratching' noise, and on a successful match, the loudspeaker emits a clicking noise.

Assembling a jigsaw puzzle is also a shape-matching activity, and FIG. 5 shows how the child-friendly digital system can be used to provide an activity very similar to assembling a puzzle. The activity starts and ends with the assembled puzzle, as in inset 507. Touching the assembled puzzle 507 leads to random scattering of puzzle pieces all over the screen. As in previous activities, pieces can be selected and moved across the screen using the finger. Selecting a piece like 503 and placing it over the proper position 505 'snaps' the piece into its place. The active piece (the one being selected or moved) always moves into the topmost layer of display 111 and is thus shown above all other pieces. By touching the navigational cutouts 309 on either side of the screen it is possible to completely bypass this activity. Leaving the activity while the puzzle is half finished leads to automatic assembly of the missing puzzle pieces.

Figure 6:
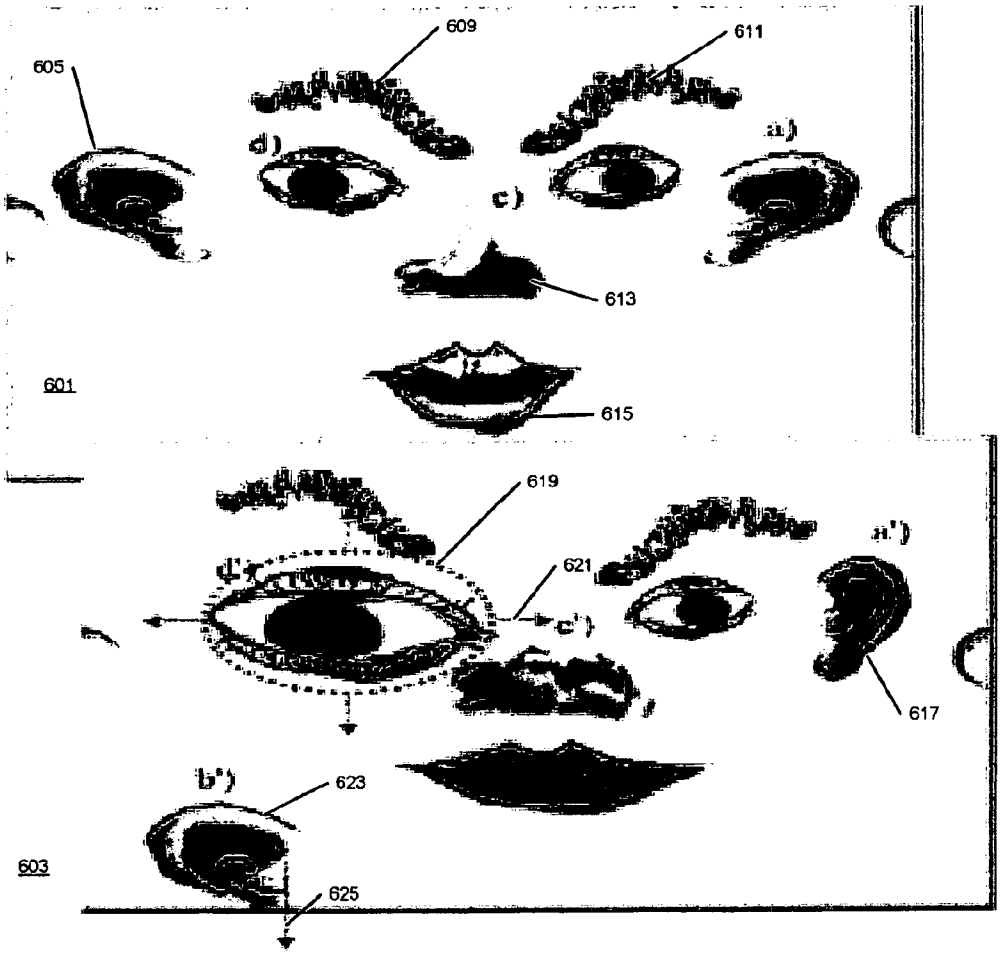
FIG. 6 shows a display for an activity in which a face is assembled out of components.

Making Faces: FIG. 6

At the start of the activity, the face parts shown at 601 are randomly selected and shown on display 111. In the beginning facial elements that occur in pairs are matching and symmetrical. To change the face, the child uses its finger to move each part to a desired location. The child may also use the throwing interaction described above to replace a face part with a new face part. For example, an ear of the type shown at 607 may be replaced by one of the type 617. The exchange is carried out by throwing" the selected part toward the bottom part of the screen. When this is done, a different part of the same class appears, for example, ear 617. In order to allow creation both of symmetrical, natural looking and 'strange' faces 'throwing' of the symmetrical parts is regulated in the following fashion: If both parts are of the same kind (for example, two blue eyes) throwing away of one part results in random replacement by a different kind (for example, with a green eye). This allows for the making of 'hybrid' faces. However, if the user wants to create a different symmetrical face, 'throwing' away of an element in a mismatched pair will result in the replacement with the appropriate element (that is, throwing away of a blue eye in a blue-green pair will result in appearance of another green eye). Double-tapping (and holding the finger down) on any face part puts the face part into a 'modifiable' mode indicated by a red outline around the part, as shown at 619. While the part is in this mode moving the finger up or down (623) across the screen changes the part's height, while moving the finger left or right changes its width.

Figure 7:
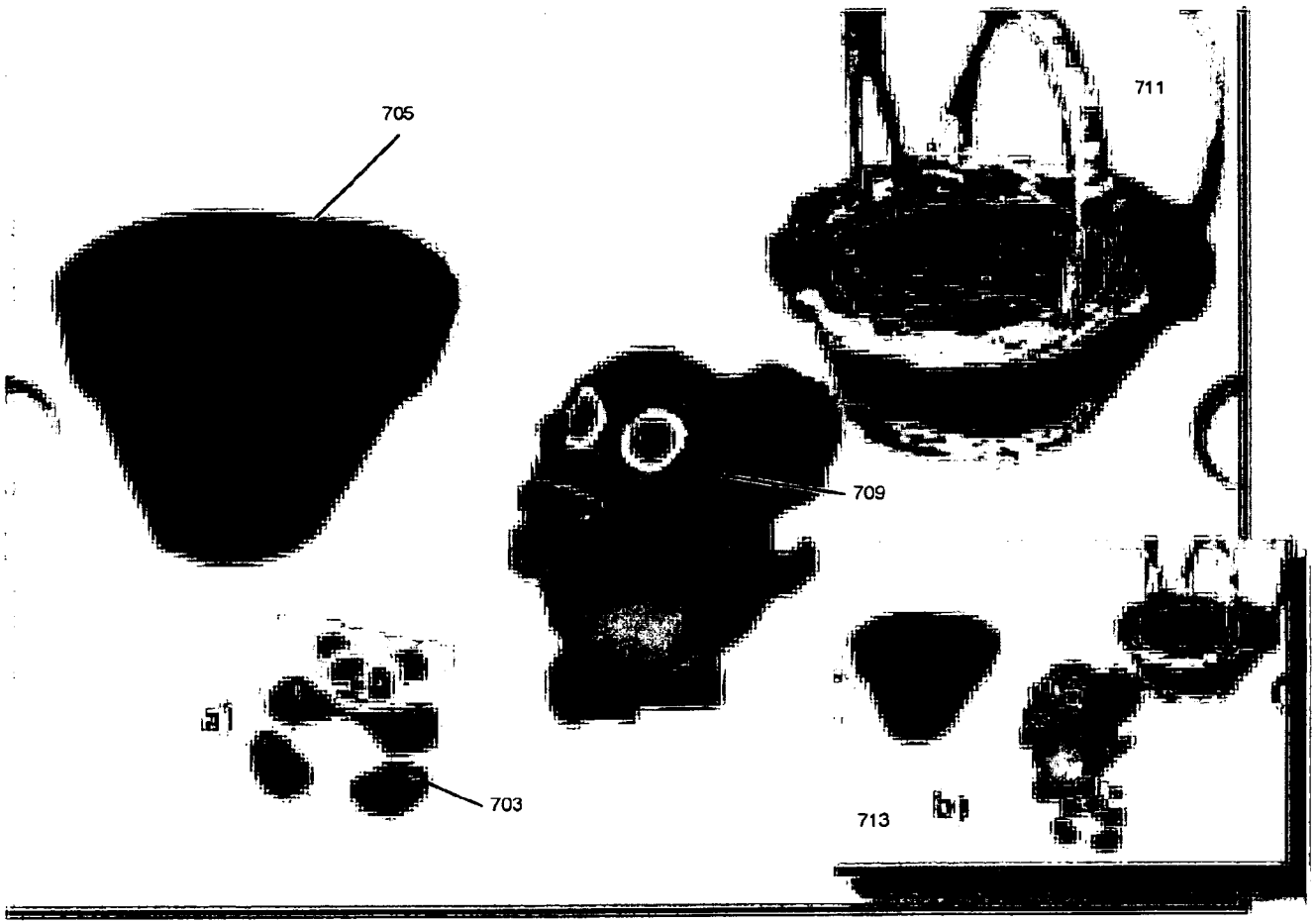
FIG. 7 shows a display for a hide-and-go-seek activity.
Figure 8:
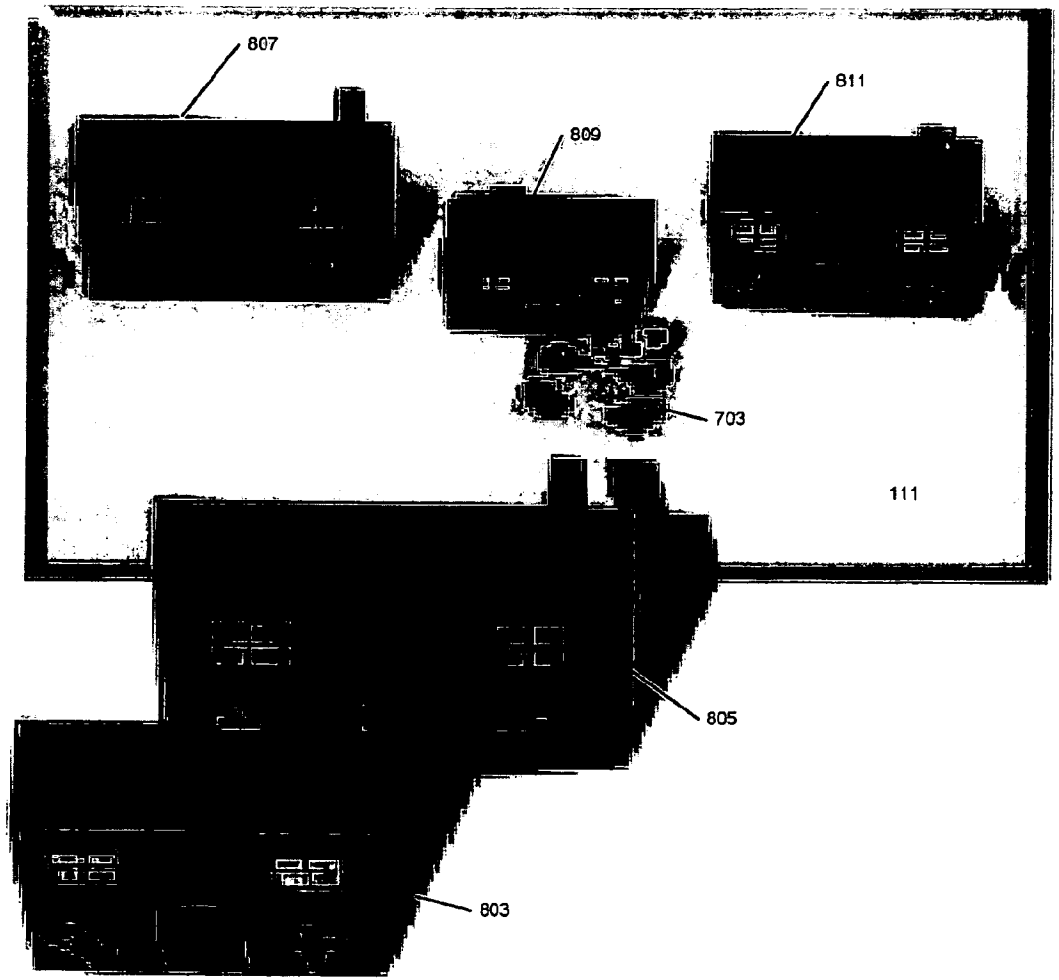
FIG. 8 shows how activities using the child-friendly digital system may be combined with activities using actual objects in the child's environment.

Hide and go Seek: FIGS. 7 and 8

FIG. 7 shows how objects in the child's environment can be included in the activities the child uses the child-friendly digital system for. The objects depicted in display 701 (flowerpot 705, duck 709, basket 711, and bear sticker 703) correspond to actual objects in the child's environment. Both real objects and objects on the screen can be used for a guessing game. Using his or her finger, the child can drag sticker 703 around and hide it behind other objects. Inset 713 shows how the child hides the sticker by pushing part of it behind an object. When the child lifts its finger from the sticker, the sticker is "pulled" behind the object, so that it is no longer visible. Once the sticker is hidden it is possible to play the guessing game—when a child taps on the object that hides the sticker with its finger, the sticker slides out with an appropriate sound effect. Tapping on other objects elicits a different sound, indicating that the sticker is not hidden behind that object.

FIG. 8 shows at 801 how the child-friendly digital system may be used to represent real objects already known to the child and how it thereby invites the child to explore the representations in display 111 in the same fashion that it explores the real objects. Here, the real objects are toy houses 805 and 803 and a real sticker like 703. A child may hide the sticker under one of the toy houses and then find the sticker by moving the houses. Display 111 has representations 807-811 of the same real houses and a representation of sticker 703. The child may hide the sticker as described above, and can find it by tapping the representations of the houses.

Figure 9:
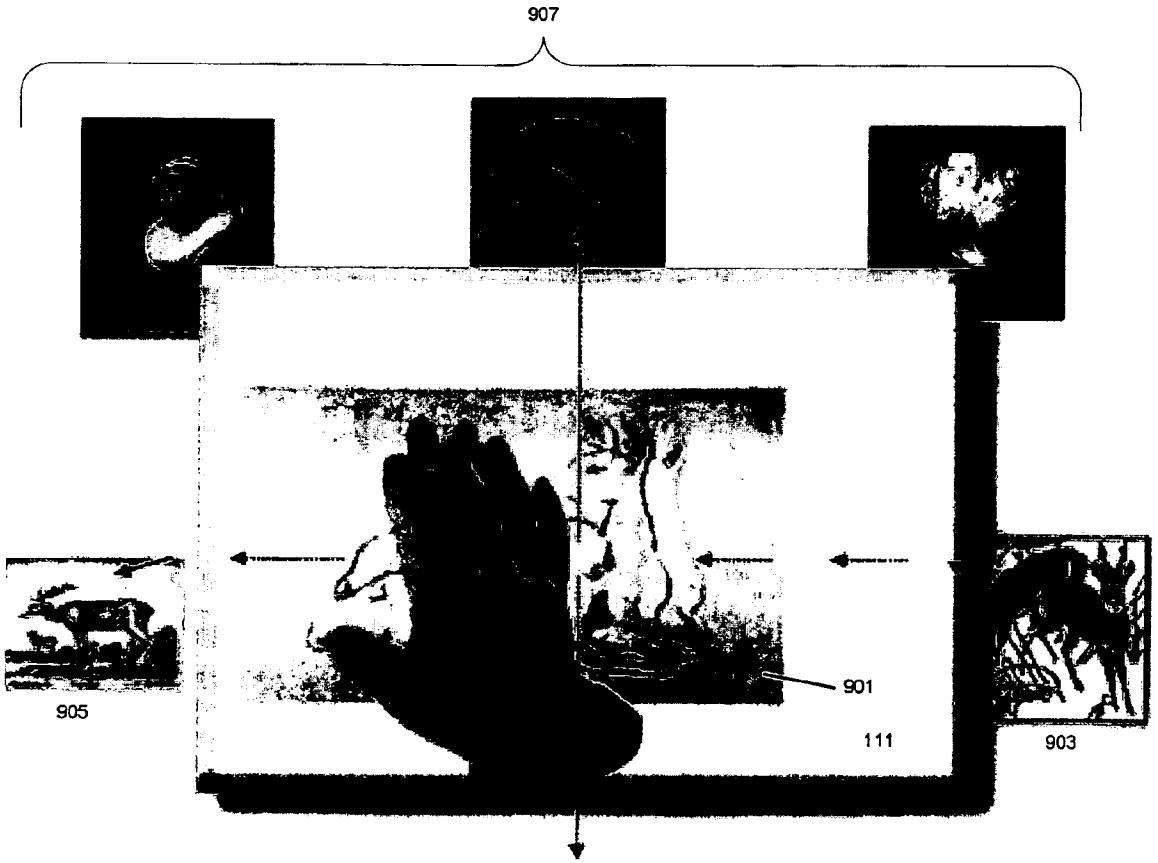
FIG. 9 shows how the child-friendly digital system may be used to view pictures.

Using Throwing to Navigate within and Between Categories: FIG. 9

As is clear from the activities already discussed, a child-friendly digital system can provide a child with many different versions of the same activity as well as with many different kinds of activities. The child-friendly digital system must thus provide the child with a simple technique that permits it to both navigate among classes of activities and versions of activities in a class and to select a one of the activities. In a preferred environment, this is done with throwing. To get another version of the present object or activity, the child throws the present one to the left or the right; to get a different class of object or activity, the child throws the present one up or down. FIG. 9 shows how this works with pictures belonging to different categories. The pictures have been divided up into the categories "deer" (901, 905, 903), "faces" 907, and "outdoors" (not shown). Presently, deer picture 901 is being displayed on display 111. If picture 901 is thrown to the left, deer picture 903 is displayed; if picture 901 is thrown to the right, deer picture 905 appears. There may be a predetermined order of pictures or the next picture to be displayed may be selected at random from the group of pictures belonging to the same category. The child can thus use throwing to the right or left to explore a category. If the child wishes to examine a new category, the child throws present picture 901 up or down. In FIG. 9, throwing current picture 901 down causes a picture belonging to faces category 907 to be displayed; throwing current picture 901 up causes a picture belonging to the "outdoors" category to be displayed; to see other pictures within the category the child throws the current picture to the left or right.

The same mechanism may be used with games. For example, throwing the shape sorting display of FIG. 4 to the left or right may result in another shape sorting game being displayed, while throwing it up or down may result in a puzzle or a face assembly game being displayed. Moreover, the activities within a category may be ordered as required by the pedagogical purpose of the category. An example might be pictures that were ordered by increasing distance from photographic realism.

Figure 10:
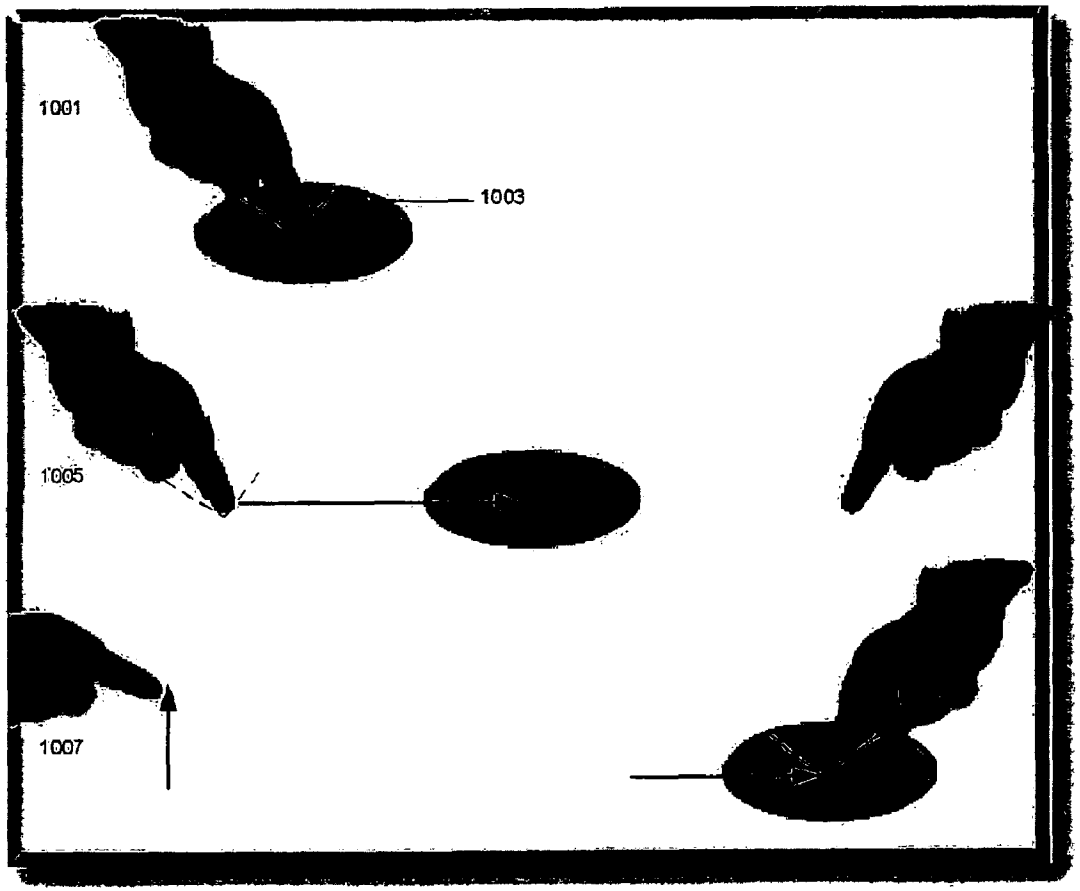
FIG. 10 shows behavior of the display when the display is being simultaneously touched in two or more locations.

Collaborative Activities: FIG. 10

FIG. 10 shows the behavior of display 111 when it is being touched at two points at once. At 1001, a child is touching an object 1003, and it moves with the child's finger, as previously described. At 1005, another child touches display 111 and object 1003 moves midway between the points at which the children are touching the display. At 1007, the first child ceases touching the display and object 1003 moves to the point at which the second child is touching the display. If more than two children touch the display at once, object 1003 moves to a point that is within the points being touched. This behavior of display 111 permits collaborative manipulation of an object.

DETAILS OF A PREFERRED EMBODIMENT

In what follows, details of an implementation of the invention will be discussed. The discussion is based for the most part on an implementation made for use in an art museum.

Implementation of Display 111

Display 111 is implemented in a preferred embodiment using a resistive, capacitive, or surface-acoustic wave touch screen. Such touch screens are available from vendors such as MicroTouch Systems, Inc., ELO, PixelTouch, or Keytec. The type of touch screen will of course determine what kinds of interactions are possible. For example, the previously-described behavior of a selected object when display 111 is being touched at more than one point simultaneously makes use of the fact that when a resistive touch screen is touched at more than one point simultaneously, the position that the touch screen driver reports to the CPU is the average of all of the positions. Some touch screens, for example those that use surface acoustic waves, can detect pressure as well as position, and this fact can be used in the interactions. An area of current experimentation is using a pressure sensitive screen to implement "3-D" interactions.

Figure 11:
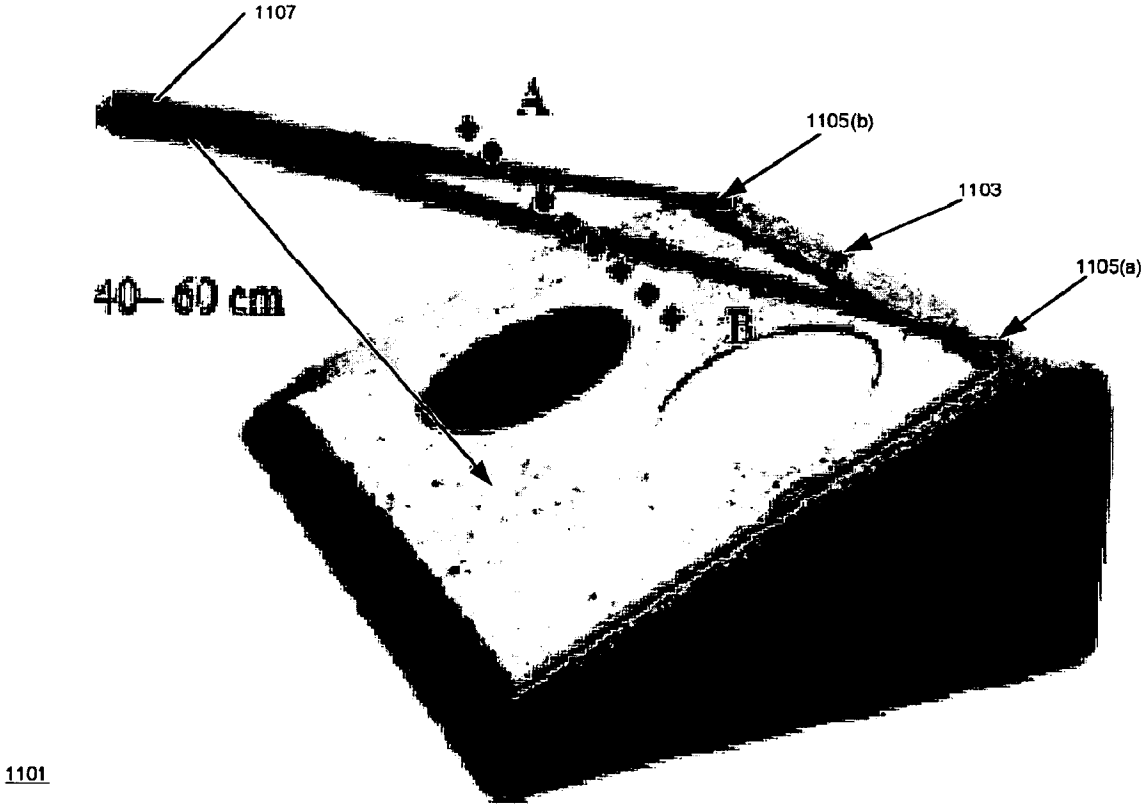
FIG. 11 shows an arrangement of presence and motion sensors in a preferred embodiment.

Implementation of Motion and Proximity Sensors 109: FIG. 11

FIG. 11 shows a presently-preferred arrangement 1.101 of motion and proximity sensors. There are three sensors: a single proximity sensor 1103 located at the middle of the top of the display and a pair of motion sensors 1105(a and b), one of the pair being located at each end of the top of the display. The sensors are constructed using commercially-available photo- or heat-sensitive cells, with input from the sensors going via a commercially-available ADBIO box by Beehive Technologies for Macintosh computers. Of course, a custom-designed data box may also be used. Proximity sensor 1103 has a wide field of view, while motion sensors 1105 have narrow fields of view. The motion sensors are adjusted so that their fields of view intersect 40-60 cm. above the center of display 111.

Proximity sensor 1103 detects the presence of an object near the child-friendly digital system. One way of using the proximity sensor is to detect the presence of a child near the system. When the child is detected, the system may make objects appear on display 111 or even go into an "attract mode" specifically designed to attract the child's attention. Another way of using it is to have objects in the display respond to the degree of closeness of an object detected by the proximity sensor. For example, a figure on the display might respond to the approach of a child's hand to the display by moving out from under the hand and thereby appearing to "run away" from it. Another example would be the "zoom" effect mentioned earlier.

Motion sensors 1105 together detect the direction and velocity of motion above display 111. Motion sensors 1105 can be used in the same fashion as proximity sensor 1103 to detect the presence of a child. They can also be used as a source of inputs that influence the behavior of the display. For example, throwing could be implemented as a response to a rapid horizontal or vertical motion of the hand above display 111. Another use of motion sensors 1105 is to control a figure on display 111 that responds to the motion sensed by the motion sensor. For example, if the child moves its hand from left to right, the figure does the same with its hand.

Programming the Child-Friendly Digital System

A prototype of a child-friendly digital system has been implemented in a Macintosh® computer manufactured by Apple Computer, Inc. The prototype has been programmed using the Supercard® programming environment manufactured by Allegiant Technologies, Inc., 9740 Scranton Rd., Suite 300, San Diego, Calif. The Supercard programming environment was developed to create interactive displays. An interactive display is called a project in the Supercard environment; each project is a sequence of one or more windows. Within a window, a sequence of one or more cards may be displayed; a card may have associated with it a background design, and a number of objects such as text, graphics, or elements such as buttons and menus. Also associated with each project is a script written in the Supertalk™ scripting language. The code in the script is executed in response to events such as a touch on display 111. Details concerning the Supercard programming environment and the Supertalk scripting language may be found in Sean Baird, et al., SUPERCARD User Guide, Allegiant Technologies, Inc., 1996, and Ken Ray, et al., SUPERCARD Script Language Guide, Allegiant Technologies, Inc., 1996. Both of these documents are hereby incorporated by reference into this patent application. In the following, the script language code for certain of the interactions will be explained in detail.

In the Supercard programs used to implement the activities described above, a project consists of a number of different kinds of activities, for example, shape matching, hide-and-go-seek, jigsaw puzzles, and face assembly. There is a window corresponding to each class of activity and a card corresponding to each version of the activity. Graphical objects are used for the shapes, slots, puzzle pieces, face parts, and the like. Behavior of the graphical objects is controlled by scripts. Details or the Scripts for the Activities: FIGS. 12-15

The scripts in the following are for an implementation of the face activity shown in FIG. 6. This activity employs selection of a component of the face by touch, dragging the component, replacing a component with another component by "throwing" the component, and modifying a component. The following detailed explanation will explain those interactions, and those skilled in the arts to which the invention pertains will easily understand from the explanation of those interactions and from the documentation for Supercard how to write scripts that perform the interactions required for the other activities.

FIG. 12 shows a graphic for a component of the face at 1201 and the first portion of the code for the MoveMe event. As shown at 1201, each graphic has a name 1203 and a number 1205. The name Leye5 1203 indicates the class of component, namely an eye, whether the eye is a left eye or right eye (here, a left eye, indicated by L), and which of a number of sets of eyes it belongs to (here, set 5). The script associated with component responds to a MouseDown event 1207, which is an indication provided by the SuperCard system that the user has touched screen 111 inside the component. The script performs a single action in response to the event, namely, it causes a user-defined event called moveMe to occur.

The code that is executed when moveMe occurs is shown at on MoveMe 1215(A) and (B) in FIGS. 12 and 13. In broad terms, on MoveMe 1215 performs the interactions that occur when the user selects a component of the face by touching it, moves the component by dragging it, obtains a new component by throwing the component, or modifies the component by touching it twice and then moving the point at which the component is touched within the component. Beginning in FIG. 12, declarations 1217 specify that MoveMe uses four global variables that it shares with other portions of the script. StartTime contains a timer value; OrigPosition contains the value of the position of the graphical component when the moveMe event occurs; CurrPosition is the current position at which screen 111 is being touched; and CurrPict is the component of the face which is presently selected for movement.

The code of 1215A then saves the current time (provided at regular intervals by the SuperCard system) in StartTime at 1219, sets the location of the target (that is, the component currently being touched) to the present location of the mouse at 1221, puts the target's short name into CurrPict (1223), and puts the target's location into OrigPosition. It is the line of code identified at 1221 that moves the center of the target to the point touched by the user, thereby providing feedback indicating that the touch has selected the target for moving.

Continuing with FIG. 13, portion 1301 of MoveMe implements dragging the component; portions 1311 and 1317 implement throwing; portion 1319 does resizing. Considering portion 1301 in more detail, portion 1301 is a loop which is executed from the time the user touches the component until the time the user ceases to touch the component. The steps of loop 1301 are the following;

The current location of the touch is saved in a local variable, OldPosition;

the target is moved to the current location of the touch;

there is a wait of two clock ticks;

the current touch position is placed in the global variable CurrPosition;

if the user is no longer touching screen 1111, the loop is exited; otherwise it is repeated.

Portions 1311 and 1317 implement throwing. The position variables OldPosition and CurrPosition each contain two values, item 1, which is the x coordinate, and item 2, which is the y component. In loop 1301, OldPosition is set a little more than two clock ticks before CurrPosition; consequently, the velocity with which a component is moved can be determined from the distance between the position specified in OldPosition and the position specified in CurrPosition (1312). In this embodiment, the velocity threshold is a distance of 2 of the distance units established by SuperCard. If the distance between the position variables is greater than that, a throw has occurred. In 1311, the throwing motion is to the left; in 1317, the cases where the throwing motion is to the right, up, or down are dealt with. Here, we need only describe 1311 in detail. As shown at 1313, first the user-defined throwLeft condition 1313 is raised; this gets rid of the part being thrown. Then the user-defined condition GetNewPart 1315 is raised; this gets the replacement part. Finally, MoveMe code 1215 is exited.

The code that is executed when these conditions are raised is shown in FIG. 15, with the code for throwLeft at 1501 and the code for GetNewPart at 1507. The code for throwleft, on throwLeft 1501 simply moves the currently-selected component (indicated by the target) to a position which is off screen 111 to the left, thereby removing the currently-selected component from the display. on GetNewPart 1507 is more involved, since it must replace the thrown part with another of the same type, and if the thrown part is a part such as an eye that comes in pairs, on GetNewPart must respond to a member of a mismatched pair that is thrown by providing a member that matches the non-thrown member and must respond to a member of a matched pair that is thrown by replacing it with a randomly-chosen member.

The first thing GetNewPart does is rename the current target "thrashedOne". Then at loop 1509, GetNewPart 1507 deals with the problem of pairs of parts. As mentioned above, the parts in a pair may either match or not match. Conceptually, each part belongs to a class of parts, such as eyes, noses, etc. Within the class, the part has an ID number, and if it is a part that comes in pairs, it has an indication whether it is the left or right member of the pair. In the preferred embodiment, this information about the part is encoded in the part's name. For instance, in the part name Leye5, eye indicates the class name, 5 the kind of eye, and L that the eye is a left eye.

In loop 1509, GetNewPart examines the name of each part in the display in turn. It keeps going until it finds a part that belongs to the same class as the current target or it has examined all of the parts. As shown at 1511, if it finds a part that belongs to the same class and has the same ID as the current target it exits loop 1509. This deals both with parts that do not belong to pairs and parts that belong to matched pairs. On the other hand, as shown at 1513, if it finds a member that belongs to the same class as the current target but is not the other member of the pair, it puts the name of the other member of the pair into the variable NewPict and exits loop 1509.

At loop 1515, the code deals with the situations where the part is not a member of a pair and where the part is a member of a matching pair. In both cases, the local variable NewPict is empty and loop 1515 randomly generates a number for a new face part. If the number is not that of the current face part, loop 1515 exits, the name for the new face part is made by adding the number to the current face part's name, and the result is stored in NewPict (1516). In code portion 1517, finally, the graphic that was thrown is replaced by the one specified in NewPict, with the replacement graphic being placed at the position on the display indicated by OrigPosition.

Returning to FIG. 13, portion 1319 of on MoveMe 1215 implements resizing when the user touches the part twice. This portion of the code is executed after the user has ceased touching the part and has thereby terminated loop 1301 and after it has been determined that the user has not thrown the part. If the user touches the part again after a period of 20 ticks has passed, the user-defined resizeMe event occurs. The code that is executed on occurrence of the event is shown at 1401 in FIG. 14.

The code begins at 1404 by making a red outline around the part visible, indicating to the user that it has been selected for modification. The body of the code is a loop 1402 which is repeated while the user continues to touch the part. On each iteration of the loop, the current position being touched is saved in Position1, there is a pause of 8 ticks, and the current position is saved in Position2. In the section of the code labeled 1405, the positions saved in the two variables are compared to determine whether the motion of the touched point had a vertical component. If the comparison indicates that the vertical component was in the upward direction, the size of the part is increased in the vertical direction (1407); if the vertical component of the motion was in the downward direction, the size of the part is decreased in the vertical direction. Section 1411 works in the same fashion with any horizontal component of the motion. When the loop terminates, the dotted line showing that the part has been selected for modification is removed.

Implementation of Other Interactions

It will be immediately apparent from the foregoing how the other interactions between the user and the child-friendly digital system are implemented. In the case of the shape matching and puzzle assembling activities, the shapes are implemented as named foreground graphics and the slots are implemented as named background graphics that have the same name as the foreground graphics that corresponds to the slots. The on MoveMe code that is executed when one of the named foreground graphics is touched includes dragging code similar to that just explained, and while the dragging is going on, the code constantly checks whether the present location of the foreground graphic is within a predetermined distance of the corresponding background graphic. If it is, the foreground graphic aligns itself with the background graphic. Moving a shape to its slot when the slot is touched is done with on MouseDown code. When the slot is touched, its name is used to construct the name of the foreground graphic to be moved and the code then moves the foreground graphic to the slot that has been touched.

In the display of pictures, the pictures are divided into categories, with the same number of pictures in each category. An array is created for the category names, and each category is thereby mapped to an index. Associated with each category name is an array for the pictures in the category, thereby mapping each picture to an index. A variable called CurrCategory contains the index of the category of the picture currently being displayed and another one called CurrPic contains the index of the picture itself. A throw is detected from the motion of the touched point in the display in the same manner as described above. When the throw is to the left, the current picture in the display is removed in that direction, the index in currPic is incremented by one, wrapping around if necessary, and the picture of the category that corresponds to the new value of currPic appears. When the throw is to the right, the same thing occurs, except that currPic is decremented.

When the throw is up, the current picture is removed, currCategory is incremented, wrapping around if necessary, and the picture corresponding to the value of currPic in the category indicated by the new value of currCategory is displayed. When the throw is down, the same thing occurs, except that currCategory is decremented.

CONCLUSION

In the foregoing Detailed Description, the inventor has described the best mode presently known to him of adapting a digital system for use by children as young as two years in such fashion that those skilled in the arts to which the disclosure pertains may make and use such a digital system. The child-friendly digital system disclosed herein has been constructed according to general principles including:

- that the digital system be child-safe;
- that a child can reach it easily;
- that interactions with the digital system require neither the use of keyboards or pointing devices such as a mouse;
- that the system adapts itself to the child's skill level;
- that interactions with the system do not require that the child read;
- that interactions do not require fine motor coordination; and
- that interactions may be done directly on the objects displayed on the screen.

One consequence of these principles is the physical form of the child-friendly digital system: a system with no cords or other appendages that sits on the floor and that uses a touch panel over an upward-facing display, a microphone, and position sensors for inputs and the display and a loudspeaker for outputs. Another consequence is a graphical user interface which permits the child to manipulate objects on the screen by touching them and moving its finger on the screen. The interface is built from actions including touching an object to select it for moving, moving the selected object by moving the finger across the screen, moving the object at a speed faster than a threshold velocity to get rid of it, and modifying the object by touching it twice and then moving the finger within the object to change its size. The Detailed Description has further disclosed how these actions can be used to create a number of activities, including shape sorting, assembling a puzzle, making a face out of component parts, and making what amounts to a digital picture book.

It will be immediately apparent to those skilled in the arts to which the disclosure pertains that there are many ways of realizing the principles demonstrated by the child-friendly digital system other than the one disclosed herein; it will also be apparent that many of the principles and techniques demonstrated in the child-friendly digital system are useful in other situations where control of a computer system by means of a keyboard and pointing device is difficult. For example, adults who have suffered a stroke or who are wearing heavy gloves have fine motor coordination problems comparable to those of small children. Moreover, interactions in the GUI such as throwing may be useful even in systems that employ standard pointing devices.

For all these reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A system for manipulating images comprising a screen upon which an image is displayed; and a computer coupled to the screen, the computer causing the images to be manipulated in response to location inputs from a pointing device, the system being characterized in that:

when the image is being dragged in response to the location inputs and the system detects that the velocity with which the image is being dragged exceeds a threshold velocity, the system responds by removing the image from the display without leaving any representative thereof in the display.

2. The system set forth in claim 1 wherein:

the removed image is automatically replaced by another image.

3. The system set forth in claim 2 wherein:

there is a plurality images, each image belonging to a class of a plurality thereof according to the image's content; and when the image that is being removed is dragged in a first direction, the removed image is replaced with a different image of the same class; and when the image that is being removed is dragged in a second direction, the removed image is replaced with an image of a different class.

4. The system set forth in claim 3 wherein:

the classes belong to a hierarchy; and the second direction includes a third direction specifying a class from a higher level in the hierarchy and a fourth direction specifying a class from a lower level in the hierarchy.

5. The system set forth in claim 1 wherein:

the pointing device is a touch panel.

6. The system set forth in claim 5 wherein:

the touch panel is transparent and is mounted on the screen.

7. A system for manipulating a movable image comprising:

a touch-sensitive screen upon which an image is displayed;

a computer coupled to the screen, the computer causing the image to be manipulated when the touch screen is touched, the system being characterized in that:

touching the movable image at a point within the image selects the image for moving and when the point being touched is being continually moved and the system detects that the velocity at which the point is moving exceeds a predetermined threshold velocity, the image being continually moved is removed from the screen without leaving any representative thereof on the screen.

8. The system set forth in claim 7 wherein:

the removed image is automatically replaced by another image.

9. The system set forth in claim 8 wherein:

there is a plurality of images, each image belonging to a class of a plurality thereof according to the image's content; and when the image that has been removed was moving in a first direction, the removed image is replaced with a different image of the same class; and when the image that has been removed was moving in a second direction, the removed image is replaced with an image of a different class.

10. The system set forth in claim 9 wherein:

the classes belong to a hierarchy; and the second direction includes a third direction specifying a class from a higher level in the hierarchy and a fourth direction specifying a class from a lower level in the hierarchy.

11. The system set forth in claim 9 wherein:

touching the movable image and touching the movable image again within a predetermined period selects the movable image for modification.

12. The system set forth in claim 11 wherein:

continually moving the point being touched after the movable image is again touched causes the image to be modified.

13. The system set forth in claim 12 wherein:

continually moving the point being touched in a vertical direction changes the height of the image.

14. The system set forth in claim 12 wherein;

continually moving the point being touched in a horizontal direction changes the width of the image.

15. Apparatus for displaying images, the apparatus comprising:

a touch screen for displaying the images and a computer coupled to the touch screen, the computer responding to a continuing touch that moves the image across the touch screen such that when the computer detects that the velocity of the touch exceeds a predetermined threshold, the computer responds by removing the image from the screen, and by replacing the image with a replacement image that is not a representative of the removed image.

16. The apparatus for displaying an image set forth in claim 15, wherein:

there is a plurality of images, each image belonging to a class of a plurality thereof according to the image's content; and when the continuing touch moves in a first direction, the replaced image is replaced with a replacement image of the same class; and when the continuing touch moves in a second direction, the replaced image is replaced with a replacement image of a different class.

17. The apparatus set forth in claim 16 wherein:

the classes belong to a hierarchy; and the second direction includes a third direction specifying a class from a higher level in the hierarchy and a fourth direction specifying a class from a lower level in the hierarchy.

*18. The system set forth in claim 2 wherein:*

*the removed image and the other image belong to an ordered set thereof;*

*if the removed image was dragged in a first direction, the other image precedes the removed image in the ordered set; and*

*if the removed image was dragged in a second direction, the other image follows the removed image in the ordered set.*

*19. The system set forth in claim 8 wherein:*

*the removed image and the other image belong to an ordered set thereof;*

*if the removed image was moved in a first direction, the other image precedes the removed image in the ordered set; and*

*if the removed image was moved in a second direction, the other image follows the removed image in the ordered set.*

*20. The system set forth in claim 15 wherein:*

*the removed image and the replacement image belong to an ordered set thereof;*

*if the removed image was moved in a first direction, the replacement image precedes the removed image in the ordered set; and*

*if the removed image was moved in a second direction, the replacement image follows the removed image in the ordered set.*

* * * * *

UNITED STATES PATENT AND TRADEMARK OFFICE

CERTIFICATE OF CORRECTION

PATENT NO. : RE43,318 E
APPLICATION NO. : 11/779310
DATED : April 17, 2012
INVENTOR(S) : Slavoljub Milekic It is certified that error appears in the above-identified patent and that said Letters Patent is hereby corrected as shown below:

Column 1, line 3:

Please insert the following at the beginning of the above-identified patent's Specification:

--Notice: More than one reissue application has been filed for the reissue of Patent No. 6,920,619. The reissue applications are 11/779,310 and 13/447,255. 11/779,310 issued on 4/17/2012 as RE43318. 13/447,225 was filed 4/15/2012 and is a divisional reissue application of 11/779,310. Both 11/779,310 and 13/447,255 are broadening reissue applications.--

Signed and Sealed this
Fourth Day of September, 2012

David J. Kappos

David J. Kappos
*Director of the United States Patent and Trademark Office*